United States Patent
Sohum et al.

(10) Patent No.: US 12,288,222 B2
(45) Date of Patent: Apr. 29, 2025

(54) METHOD AND SYSTEM FOR APPLICATION INSTALLATION AND DETECTION OF FRAUD IN ADVERTISEMENT

(71) Applicant: Affle (India) Limited, Mumbai (IN)

(72) Inventors: Anuj Khanna Sohum, Singapore (SG); Charles Yong Jien Foong, Singapore (SG); Madhusudana Ramakrishna, Singapore (SG)

(73) Assignee: Affle (India) Limited, Mumbai (IN)

( * ) Notice: Subject to any disclaimer, the term of this patent is extended or adjusted under 35 U.S.C. 154(b) by 297 days.

(21) Appl. No.: 16/653,776

(22) Filed: Oct. 15, 2019

(65) Prior Publication Data
US 2020/0118162 A1    Apr. 16, 2020

(30) Foreign Application Priority Data
Oct. 15, 2018  (IN) .............................. 201821039074

(51) Int. Cl.
*G06Q 30/0241* (2023.01)
*H04L 9/40* (2022.01)
(Continued)

(52) U.S. Cl.
CPC ..... *G06Q 30/0248* (2013.01); *H04L 63/1425* (2013.01); *H04L 63/1483* (2013.01); *H04L 67/535* (2022.05); *H04W 12/12* (2013.01)

(58) Field of Classification Search
None
See application file for complete search history.

(56) References Cited

U.S. PATENT DOCUMENTS 4,674,041 A * 6/1987 Lemon ................. G06Q 20/387
                                                                 235/381
7,657,626 B1    2/2010 Zwicky
(Continued)

FOREIGN PATENT DOCUMENTS

| WO | WO-3102738 A2 * | 12/2003 | ............ G06Q 30/02 |
| WO | WO-2008030670 A1 * | 3/2008 | ............ G06Q 30/02 |
| WO | WO-2009020976 A1 * | 2/2009 | ............ G06Q 10/04 |

OTHER PUBLICATIONS

• Maciej Zawadziński. What Is Ad Fraud and How Does It Work? 9 Techniques Explained. (Mar. 11, 2014). Retrieved online Dec. 18, 2021. https://clearcode.cc/blog/rtb-online-advertising-fraud/ (Year: 2014).*

(Continued)

*Primary Examiner* — James A Reagan
(74) *Attorney, Agent, or Firm* — Kolisch Hartwell, P.C.

(57) ABSTRACT

The present disclosure provides a method and system for application installation and detection of fraud in advertisement. The system receives a request for installing an application from a plurality of users in real time. In addition, the system provides one or more methods to the plurality of users for installing the application. Further, the system receives a first set of data and a second set of data in real time. Furthermore, the system analyzes the first set of data and the second set of data in real time. Moreover, the system identifies a user of the plurality of users and a publisher of a plurality of publishers committing the fraud. Also, the system blocks one or more users and one or more publishers committing the fraud in real time.

14 Claims, 4 Drawing Sheets

(51) Int. Cl.
*H04L 67/50* (2022.01)
*H04W 12/12* (2021.01)

(56) References Cited

U.S. PATENT DOCUMENTS

| | | |
|---|---|---|
| 8,561,184 B1 | 10/2013 | Marsa et al. |
| 8,745,154 B1 | 6/2014 | Froment et al. |
| 8,745,194 B2* | 6/2014 | Uribe-Etxebarria Jimenez .......... G06Q 20/322 709/223 |
| 9,847,999 B2* | 12/2017 | Van Os ................. H04W 12/06 |
| 9,852,427 B2 | 12/2017 | Caldera |
| 10,009,358 B1* | 6/2018 | Xie ...................... G06F 21/552 |
| 10,110,616 B1* | 10/2018 | Xie ........................ H04L 67/30 |
| 10,183,231 B1* | 1/2019 | Lowe ..................... A63H 33/22 |
| 10,334,054 B2* | 6/2019 | Van Os ................... G06F 21/10 |
| 10,346,277 B2* | 7/2019 | Mermoud ........... H04L 43/0888 |
| 10,395,018 B2* | 8/2019 | Turgeman ............... G06F 3/017 |
| 10,491,614 B2 | 11/2019 | Grill et al. |
| 10,496,808 B2* | 12/2019 | Van Os ................... G06F 3/048 |
| 10,681,060 B2 | 6/2020 | Scheidler et al. |
| 10,915,358 B2* | 2/2021 | Miry .................. G06Q 10/0631 |
| 10,929,879 B2* | 2/2021 | Cheng ................ G06Q 30/0248 |
| 11,151,605 B2 | 10/2021 | Sohum et al. |
| 11,157,952 B2 | 10/2021 | Sohum et al. |
| 11,574,041 B2* | 2/2023 | Van Os ................... G06F 21/84 |
| 11,803,875 B2 | 10/2023 | Sohum et al. |
| 2003/0220860 A1 | 11/2003 | Heytens et al. |
| 2005/0278542 A1 | 12/2005 | Pierson et al. |
| 2006/0136294 A1 | 6/2006 | Linden et al. |
| 2007/0097096 A1 | 5/2007 | Rosenberg |
| 2007/0129999 A1* | 6/2007 | Zhou .................. G06Q 30/0273 705/14.69 |
| 2007/0240217 A1* | 10/2007 | Tuvell ................... H04L 63/145 713/188 |
| 2007/0255821 A1 | 11/2007 | Ge et al. |
| 2008/0052278 A1 | 2/2008 | Zlotin et al. |
| 2008/0103955 A1 | 5/2008 | Flake et al. |
| 2008/0215725 A1 | 9/2008 | Backer et al. |
| 2011/0161492 A1 | 6/2011 | Granville |
| 2012/0084146 A1 | 4/2012 | Zwicky |
| 2012/0166285 A1* | 6/2012 | Shapiro .............. G06Q 30/0261 705/14.58 |
| 2012/0221955 A1* | 8/2012 | Raleigh ............... H04L 12/1485 715/736 |
| 2013/0141396 A1 | 6/2013 | Lynn et al. |
| 2013/0204993 A1* | 8/2013 | Uribe-Etxebarria Jimenez .......... H04L 41/50 709/223 |
| 2013/0226692 A1 | 8/2013 | Kouladjie et al. |
| 2013/0325591 A1* | 12/2013 | Delug ................ G06Q 30/0248 705/14.45 |
| 2013/0346202 A1 | 12/2013 | Kouladjie et al. |
| 2014/0156390 A1 | 6/2014 | Aaron et al. |
| 2014/0358671 A1* | 12/2014 | Wei .................... G06Q 30/0248 705/14.45 |
| 2014/0358678 A1 | 12/2014 | Raab et al. |
| 2015/0051970 A1 | 2/2015 | Stafford, Jr. et al. |
| 2015/0142689 A1* | 5/2015 | Squires ................. G01C 22/00 705/329 |
| 2015/0143456 A1* | 5/2015 | Raleigh ............... H04W 12/088 726/1 |
| 2015/0178567 A1* | 6/2015 | Baek ..................... G06F 16/583 455/414.2 |
| 2015/0213246 A1* | 7/2015 | Turgeman ............... G06F 21/31 726/23 |
| 2015/0262226 A1* | 9/2015 | Howe ................ G06Q 30/0248 705/14.47 |
| 2015/0264068 A1 | 9/2015 | Beauchesne |
| 2015/0309610 A1 | 10/2015 | Rabii et al. |
| 2015/0339705 A1 | 11/2015 | Raji et al. |
| 2015/0339721 A1 | 11/2015 | Raji et al. |
| 2015/0350149 A1* | 12/2015 | Acharya ................. H04L 51/32 709/206 |
| 2015/0378465 A1 | 12/2015 | Shih et al. |
| 2016/0094573 A1 | 3/2016 | Sood et al. |
| 2016/0112475 A1 | 4/2016 | Lawson et al. |
| 2016/0119320 A1* | 4/2016 | Bansal ..................... H04W 4/02 705/14.47 |
| 2016/0132139 A1 | 5/2016 | Du et al. |
| 2016/0173944 A1 | 6/2016 | Kilar et al. |
| 2016/0239342 A1* | 8/2016 | Miry .................. G06Q 10/0631 |
| 2016/0283975 A1* | 9/2016 | Kaul .................. G06Q 30/0248 |
| 2017/0032114 A1* | 2/2017 | Turgeman ............. H04W 12/06 |
| 2017/0063911 A1 | 3/2017 | Muddu et al. |
| 2017/0085587 A1* | 3/2017 | Turgeman ........... G06F 3/03547 |
| 2017/0178072 A1 | 6/2017 | Poornachandran et al. |
| 2017/0187751 A1* | 6/2017 | Andrews ................. H04L 63/08 |
| 2017/0195353 A1 | 7/2017 | Taylor et al. |
| 2017/0236330 A1* | 8/2017 | Seif ..................... G06F 3/04842 345/633 |
| 2017/0243028 A1* | 8/2017 | LaFever ............. G06F 21/6263 |
| 2017/0287014 A1 | 10/2017 | Vu et al. |
| 2017/0308909 A1* | 10/2017 | Faith .................. G06K 9/00315 |
| 2017/0359306 A1* | 12/2017 | Thomas ................ H04L 63/145 |
| 2018/0020002 A1 | 1/2018 | Duca et al. |
| 2018/0041899 A1* | 2/2018 | Richards ............. H04L 63/1425 |
| 2018/0108016 A1 | 4/2018 | Jin et al. |
| 2018/0160309 A1* | 6/2018 | Turgeman ............... G06F 21/83 |
| 2018/0253212 A1 | 9/2018 | Oliver et al. |
| 2018/0276709 A1 | 9/2018 | Li et al. |
| 2018/0292890 A1* | 10/2018 | Swanson ............... G06F 3/0346 |
| 2018/0316722 A1 | 11/2018 | Jenson |
| 2018/0332058 A1 | 11/2018 | Maxwell et al. |
| 2018/0337936 A1 | 11/2018 | Mehrotra et al. |
| 2018/0351786 A1* | 12/2018 | Pope ....................... H04L 67/10 |
| 2018/0359280 A1* | 12/2018 | Elworthy ............. H04L 63/1416 |
| 2019/0057009 A1 | 2/2019 | Wang et al. |
| 2019/0098004 A1* | 3/2019 | Mars ..................... H04W 12/06 |
| 2019/0130440 A1 | 5/2019 | Qiu et al. |
| 2019/0220863 A1* | 7/2019 | Novick ................. H04W 12/122 |
| 2019/0268302 A1* | 8/2019 | McDonald ............. H04L 63/10 |
| 2019/0333098 A1 | 10/2019 | Sohum et al. |
| 2019/0333099 A1 | 10/2019 | Sohum et al. |
| 2019/0333101 A1 | 10/2019 | Sohum et al. |
| 2019/0333102 A1 | 10/2019 | Sohum et al. |
| 2019/0333103 A1 | 10/2019 | Sohum et al. |
| 2020/0118162 A1 | 4/2020 | Sohum et al. |
| 2020/0118163 A1 | 4/2020 | Sohum et al. |

OTHER PUBLICATIONS

• Stylianos S. Mamais et al. Behavioural Verification: Preventing Report Fraud in Decentralized Advert Distribution Systems. (Sep. 18, 2017). Retrieved online Dec. 18, 2021. https://www.mdpi.com/1999-5903/9/44/88/pdf (Year: 2017).*

• Feng Dong et al. FraudDroid: Automated Ad Fraud Detection for Android Apps. (Jun. 13, 2018). Retrieved online Dec. 18, 2021. https://arxiv.org/pdf/1709.01213.pdf (Year: 2018).*

* cited by examiner

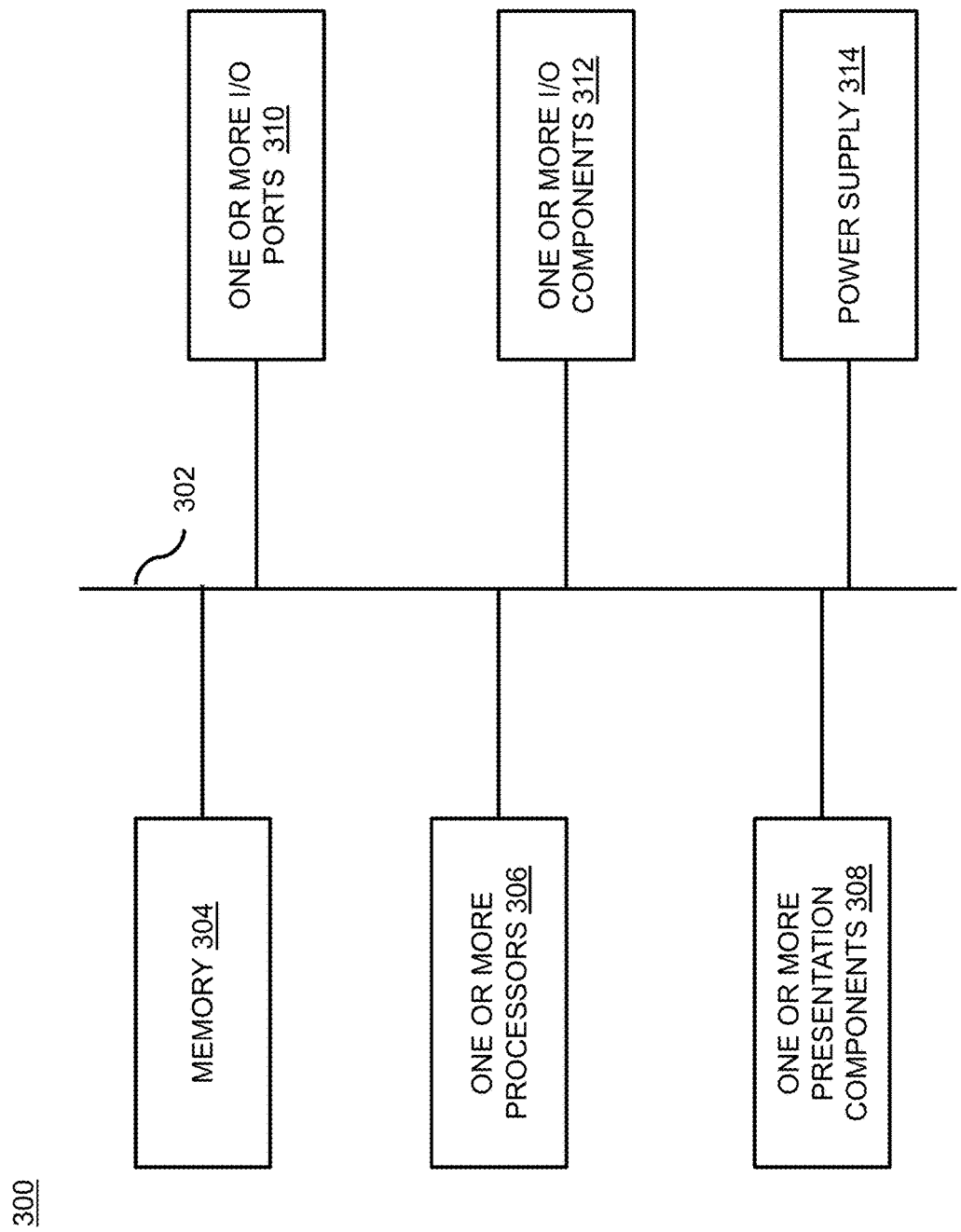

METHOD AND SYSTEM FOR APPLICATION INSTALLATION AND DETECTION OF FRAUD IN ADVERTISEMENT

TECHNICAL FIELD

The present disclosure relates to the field of advertisement and, in particular, relates to a method and system for application installation and detection of fraud in advertisement.

INTRODUCTION

With the advancements in technology over the last few years, users have predominantly shifted towards smartphones for accessing multimedia content. Nowadays, users access content through a number of mobile applications available for download through various online application stores by clicking on the media device. Businesses (Advertisers) have started focusing on generating revenue by targeting consumers through these mobile applications. In addition, businesses have started investing heavily on doing business through these mobile applications. Moreover, businesses (publishers and/or advertising networks) have started developing advertisement capable applications for serving advertisements through these mobile applications. These advertisements are published in real time or fixed placements through these mobile applications and watched by the users. The advertisers are benefited in terms of internet traffic generated on clicking, taking action like installing or on watching these advertisements. However, certain online publishers and advertising networks working with these publishers take undue advantage of this in order to generate high revenues. These online publishers and advertising networks employ fraudulent techniques in order to generate clicks, or increasing actions like increasing number of application installs for the advertisers through fraudulent means. In addition, these online publishers incentivize the users for clicking the links, downloading applications and the like. This results in a loss of advertisers marketing budget spent as many times these publishers claim a normal user-initiated action (Organic action, e.g. Organic Install) as one initiated by them or at times the clicks or application installs are not driven by humans at all and instead by bots. There is a consistent need to stop publishers from performing such types of click fraud and transaction fraud.

SUMMARY

In a first example, a computer-implemented method is provided. The computer-implemented method is configured for application installation and detection of fraud in advertisement. The computer implemented method includes a first step to display one or more advertisements on mobile applications and web applications on a plurality of media devices. In addition, the plurality of media devices is associated with a plurality of users. Further, the one or more advertisements are displayed on the basis of interests of the plurality of users. Furthermore, the one or more advertisements are displayed for installing an application. Moreover, the one or more advertisements are displayed on a plurality of publishers. Also, the one or more advertisements are displayed in real time. In addition, the computer implemented method includes a second step to receive a request to download the application. The plurality of users requests for installing the application through the plurality of media devices. In addition, the request for installing the application is generated by clicking on the one or more advertisements displayed on the plurality of media devices. Further, the request for installing the application is received in real time. Further, the computer implemented method includes a third step to provide one or more methods to the plurality of users. The one or more methods are provided to the plurality of users for installing the application. In addition, the one or more methods include ways to authenticate the plurality of users. Further, the one or more methods are provided in real time. Furthermore, the computer implemented method includes a fourth step to fetch a first set of data from a database and the plurality of media devices. The first set of data is associated with past typing behavior of the plurality of users. In addition, the first set of data is received in real time. Moreover, the computer implemented method includes a fifth step to obtain a second set of data from the plurality of media devices. The second set of data is associated with a plurality of hardware components. In addition, the second set of data is obtained in real time. Also, the computer implemented method includes a sixth step to analyze the first set of data and the second set of data. The first set of data and the second set of data are analyzed using one or more machine learning algorithm. In addition, analysis is done to authenticate a user of the plurality of users for installing the application. Further, the first set of data and the second set of data are analyzed to identify that the fraud being committed by the plurality of users or the plurality of publishers. Furthermore, the first set of data and the second set of data are analyzed in real time. Also, the computer implemented method includes a seventh step to block a publisher of the plurality of publishers and the user of the plurality of users committing the fraud. The publisher of the plurality of publishers and the user of the plurality of users committing the fraud are identified on the basis of analysis of the first set of data and the second set of data. In addition, the publisher and the user are blocked in real time.

In an embodiment of the present disclosure, the plurality of publishers includes web pages, websites, mobile applications and blogs.

In an embodiment of the present disclosure, the one or more methods include making a pattern, solving a puzzle, speaking a sentence, scanning a barcode, writing a captcha and scanning an eye movement.

In an embodiment of the present disclosure, the first set of data includes touch delay, touch length, typing behavior, typing language, voice command length, voice recognition, touch pattern and gesture recognition.

In an embodiment of the present disclosure, the second set of data includes location of media device, user data, type of media device, pre-installed applications and available storage.

In an embodiment of the present disclosure, the plurality of hardware components includes gyroscope, an accelerometer, a proximity sensor, a light sensor, barometer, magnetometer, microphone, fingerprint sensor, image sensor and touch screen.

In an embodiment of the present disclosure, the one or more machine learning algorithm include linear discriminant analysis, learning vector quantization, linear regression, logistic regression, sum of vector machine, decision tree, random forest, K-nearest neighbor function and time series.

In an embodiment of the present disclosure, the fraud identification system identifies the user and the publisher committing the fraud. The identification of the fraud is done by comparing past typing behavior and present typing behavior of the one or more users of the plurality of users in real time.

In an embodiment of the present disclosure, the fraud identification system generates a report. In addition, the report has a list of the user and the publisher committing the fraud.

In a second example, a computer system is provided. The computer system includes one or more processors and a memory. The memory is coupled to the one or more processors. The memory stores instructions. The instructions are executed by the one or more processors. The execution of instructions causes the one or more processors to perform a method for application installation and detection of fraud in advertisement. The computer implemented method includes a first step to display one or more advertisements on mobile applications and web applications on a plurality of media devices. In addition, the plurality of media devices is associated with a plurality of users. Further, the one or more advertisements are displayed on the basis of interests of the plurality of users. Furthermore, the one or more advertisements are displayed for installing an application. Moreover, the one or more advertisements are displayed on a plurality of publishers. Also, the one or more advertisements are displayed in real time. In addition, the computer implemented method includes a second step to receive a request to download the application. The plurality of users requests for installing the application through the plurality of media devices. In addition, the request for installing the application is generated by clicking on the one or more advertisements displayed on the plurality of media devices. Further, the request for installing the application is received in real time. Further, the computer implemented method includes a third step to provide one or more methods to the plurality of users. The one or more methods are provided to the plurality of users for installing the application. In addition, the one or more methods include ways to authenticate the plurality of users. Further, the one or more methods are provided in real time. Furthermore, the computer implemented method includes a fourth step to fetch a first set of data from a database and the plurality of media devices. The first set of data is associated with past typing behavior of the plurality of users. In addition, the first set of data is received in real time. Moreover, the computer implemented method includes a fifth step to obtain a second set of data from the plurality of media devices. The second set of data is associated with a plurality of hardware components. In addition, the second set of data is obtained in real time. Also, the computer implemented method includes a sixth step to analyze the first set of data and the second set of data. The first set of data and the second set of data are analyzed using one or more machine learning algorithm. In addition, analysis is done to authenticate a user of the plurality of users for installing the application. Further, the first set of data and the second set of data are analyzed to identify that the fraud being committed by the plurality of users or the plurality of publishers. Furthermore, the first set of data and the second set of data are analyzed in real time. Also, the computer implemented method includes a seventh step to block a publisher of the plurality of publishers and the user of the plurality of users committing the fraud. The publisher of the plurality of publishers and the user of the plurality of users committing the fraud are identified on the basis of analysis of the first set of data and the second set of data. In addition, the publisher and the user are blocked in real time.

In a third example, a non-transitory computer-readable storage medium is provided. The computer executable instructions that, when executed by at least one processor, performs a method. The method is configured for application installation and detection of fraud in advertisement. The computer implemented method includes a first step to display one or more advertisements on mobile applications and web applications on a plurality of media devices. In addition, the plurality of media devices is associated with a plurality of users. Further, the one or more advertisements are displayed on the basis of interests of the plurality of users. Furthermore, the one or more advertisements are displayed for installing an application. Moreover, the one or more advertisements are displayed on a plurality of publishers. Also, the one or more advertisements are displayed in real time. In addition, the computer implemented method includes a second step to receive a request to download the application. The plurality of users requests for installing the application through the plurality of media devices. In addition, the request for installing the application is generated by clicking on the one or more advertisements displayed on the plurality of media devices. Further, the request for installing the application is received in real time. Further, the computer implemented method includes a third step to provide one or more methods to the plurality of users. The one or more methods are provided to the plurality of users for installing the application. In addition, the one or more methods include ways to authenticate the plurality of users. Further, the one or more methods are provided in real time. Furthermore, the computer implemented method includes a fourth step to fetch a first set of data from a database and the plurality of media devices. The first set of data is associated with past typing behavior of the plurality of users. In addition, the first set of data is received in real time. Moreover, the computer implemented method includes a fifth step to obtain a second set of data from the plurality of media devices. The second set of data is associated with a plurality of hardware components. In addition, the second set of data is obtained in real time. Also, the computer implemented method includes a sixth step to analyze the first set of data and the second set of data. The first set of data and the second set of data are analyzed using one or more machine learning algorithm. In addition, analysis is done to authenticate a user of the plurality of users for installing the application. Further, the first set of data and the second set of data are analyzed to identify that the fraud being committed by the plurality of users or the plurality of publishers. Furthermore, the first set of data and the second set of data are analyzed in real time. Also, the computer implemented method includes a seventh step to block a publisher of the plurality of publishers and the user of the plurality of users committing the fraud. The publisher of the plurality of publishers and the user of the plurality of users committing the fraud are identified on the basis of analysis of the first set of data and the second set of data. In addition, the publisher and the user are blocked in real time.

BRIEF DESCRIPTION OF DRAWINGS

Figure 1:
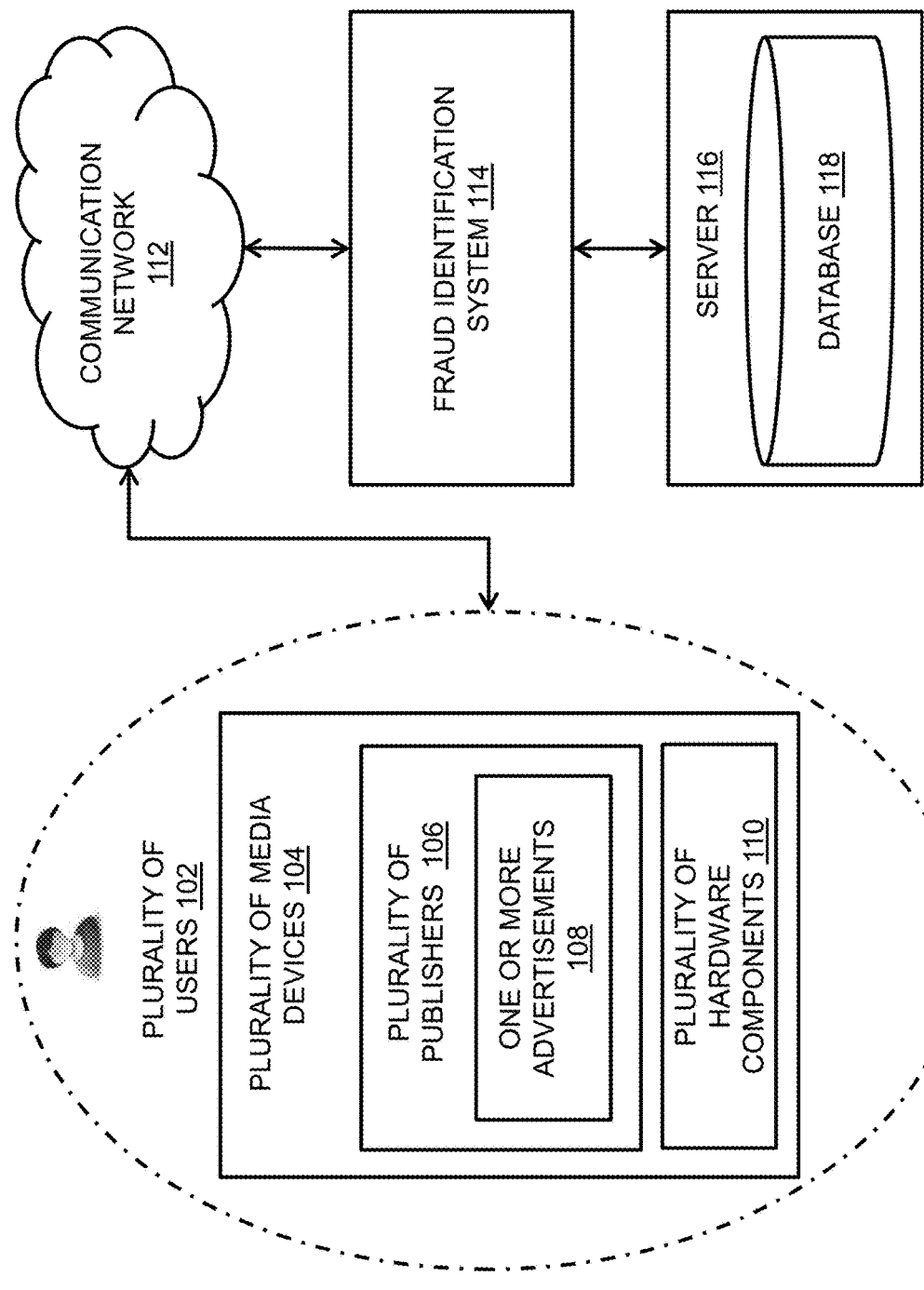
Figure 2A:
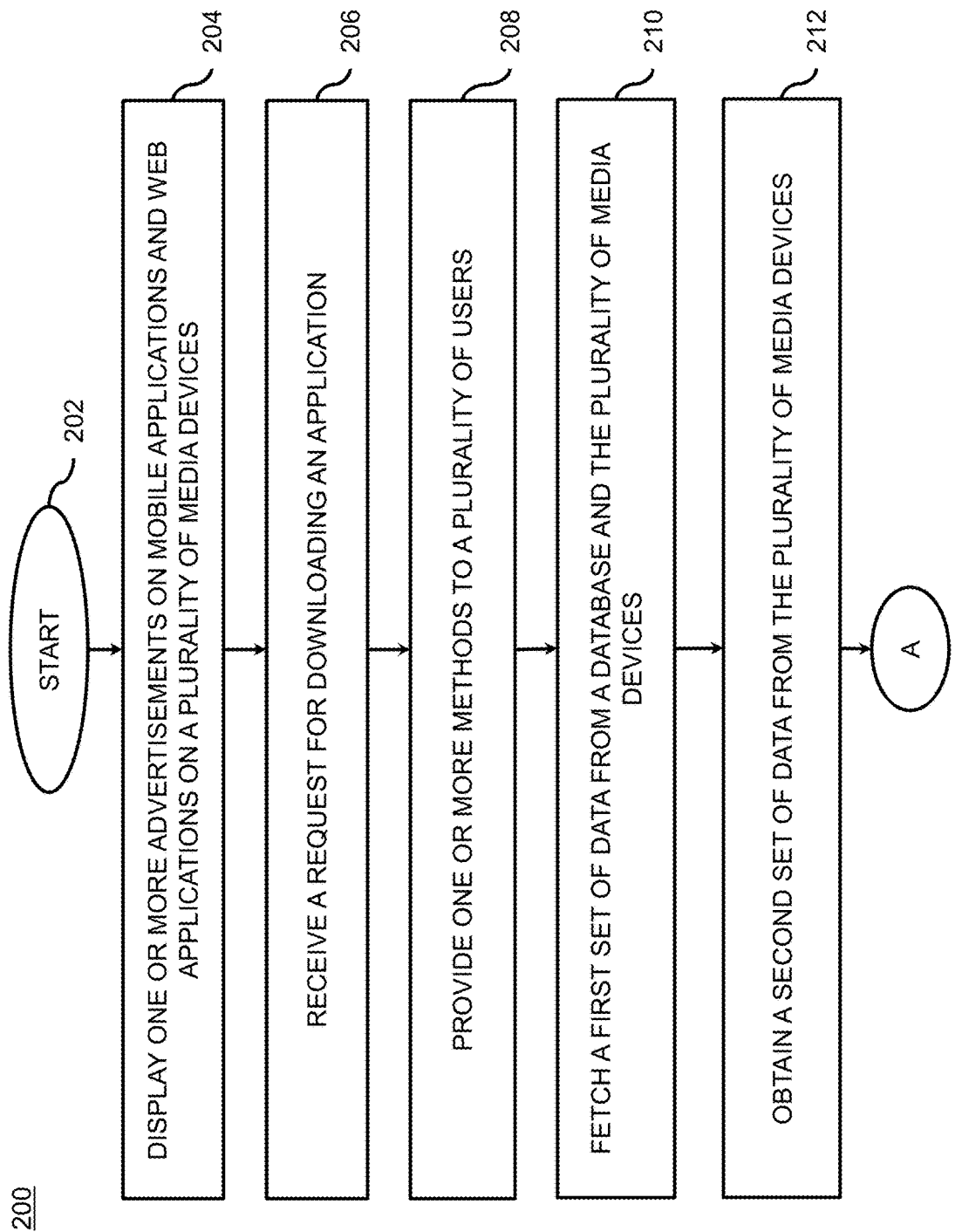
Figure 2B:
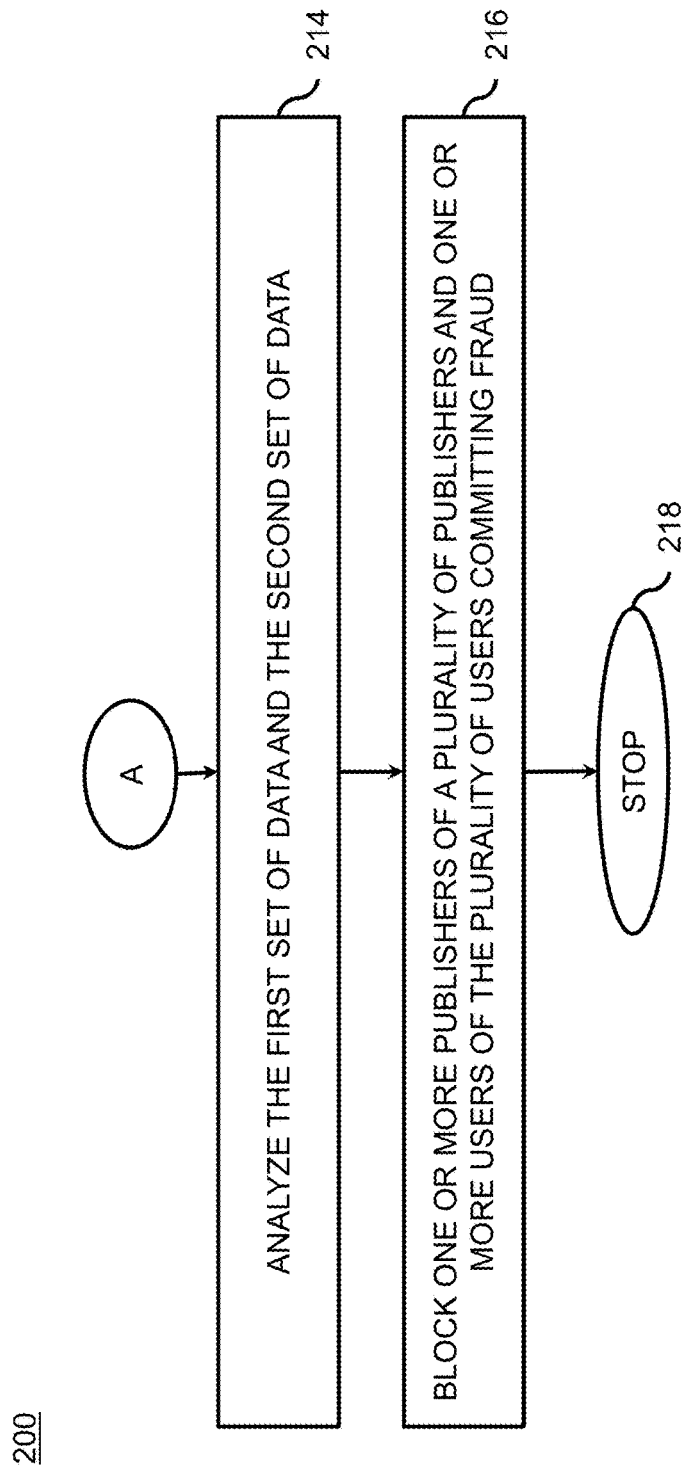

Having thus described the invention in general terms, references will now be made to the accompanying figures, wherein:

FIG. 1 illustrates an interactive computing environment for an application installation and fraud detection, in accordance with various embodiments of the present disclosure; and FIGS. 2A and 2B illustrate a flowchart of a method for the application installation and fraud detection, in accordance with various embodiments of the present disclosure; and FIG. 3 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1 illustrates an interactive computing environment 100 for an application installation and fraud detection, in accordance with various embodiments of the present disclosure. The interactive computing environment 100 shows a relationship between various entities involved in application installation and detection of a fraud in advertisements 108. The interactive computing environment 100 includes a plurality of users 102, a plurality of media devices 104, a plurality of publishers 106, one or more advertisements 108, a plurality of hardware components 110, a communication network 112, a fraud identification system 114, a server 116 and a database 118. In addition, each of the components of the interactive computing environment 100 interacts with each other to share advertisement fraud data in real-time.

In general, fraud in advertisement is done to generate more revenue from advertisements being displayed by generating fake installs or clicks. In addition, fake installs or clicks are done with help of software, bots. Further, fake installs or fake traffic is done through techniques such as click fraud, transaction fraud and the like. Furthermore, click fraud corresponds to regular or constant clicking by user on advertisements in order to generate more revenue for publishers. Moreover, click fraud is done when publishers get paid based on pay-per-click or pay-per-view whenever advertisements are clicked. Also, click fraud refers to the generation of fraudulent clicks through online bots which are not identifiable and are treated as genuine install. Also, transaction fraud refers to initiating install via fake clicks and bots. In addition, transaction fraud takes place when publishers apply fraudulent techniques to drive fake installs of applications in order to generate more revenue.

The interactive computing environment 100 includes the plurality of users 102. Each of the plurality of users 102 is any person present at any location and may or may not access multimedia content. In addition, the plurality of users 102 is any legal person or natural person who access online multimedia content and need an IP based network for accessing multimedia content. Further, the plurality of users 102 is individuals or persons who accesses online multimedia content on the plurality of media devices 104. In an embodiment of the present disclosure, the plurality of users 102 includes but may not be limited to a natural person, legal entity, the individual, machines and robots for viewing the one or more advertisements 108.

In addition, the interactive computing environment 100 includes the plurality of media devices 104 that helps to communicate information. In an embodiment of the present disclosure, the plurality of media devices 104 includes but may not be limited to a smartphone, a laptop, a desktop computer, a tablet, a personal digital assistant, a smart television, a workstation and an electronic wearable device. In an embodiment of the present disclosure, the plurality of media devices 104 is portable communication devices and fixed communication devices. The plurality of users 102 access the plurality of media devices 104 in real-time. In addition, the plurality of media devices 104 is any type of devices having an active internet connection. Further, the plurality of media devices 104 are internet-enabled devices for allowing the plurality of users 102 to access the plurality of publishers 106. In addition, the plurality of users 102 utilizes the plurality of media devices 104 for viewing the one or more advertisements 108.

Further, the interactive computing environment 100 includes the plurality of publishers 106. The plurality of publishers 106 utilizes the plurality of media devices 104 for displaying multimedia content. In an embodiment of the present disclosure, the plurality of publishers 106 includes but may not be limited to mobile application, web application, and website. The plurality of publishers 106 is mobile application that displays the one or more advertisements 108 to the plurality of users 102 on the plurality of media devices 104. The one or more advertisements 108 include audio advertisements, video advertisements, audio-video advertisements, image advertisements and the like. The plurality of publishers 106 displays the one or more advertisements 108 based on interest of the plurality of users 102 in real time. In an example, a user of the plurality of users 102 is interested in watching online videos, reading blogs, play online games, accessing social networking sites and the like. In addition, the plurality of publishers 106 shows the one or more advertisements 108 related to interest of the user.

The plurality of publishers 106 is advertisement supporting applications that are stored in the plurality of media devices 104. In general, publisher provides space; frame, area or a part of their application pages for advertising purposes. In addition, the space, frame, area, or part is referred to as advertisement slots. In addition, publisher consists of various advertisement slots that depend on the choice of publisher. Further, publisher advertises products, services or businesses to users for generating revenue. Furthermore, publisher displays advertisement on media devices when user accesses publisher.

The one or more advertisements 108 are a graphical or pictorial representation of information to promote a product, an event, service and the like. In general, advertisement is a medium for promoting a product, service, or an event. In addition, advertisements are displayed in third party applications developed by application developers. Further, advertisements are presented for attracting user based on their interest in order to generate more revenue. The plurality of users 102 clicks on the one or more advertisements 108 and the plurality of users 102 are re-directed to a website or application or application store associated with the clicked advertisement. In general, advertisements are provided to publishers by an advertiser who wants to advertise their product, services. In addition, publishers get paid when the user visits the application or website through the advertisement of the advertiser.

The one or more advertisements 108 are placed on the advertisement slots on the plurality of publishers 106 on the plurality of media devices 104 associated with the plurality of users 102. In general, advertiser purchases advertisement slots from publishers. In addition, advertisement may be served based on a real-time bidding technique or a direct contract between the advertiser and publisher. Further, advertisement networks enable display of advertisement in real-time on publisher on behalf of the advertiser. Furthermore, advertising networks are entities that connect the advertiser to websites and mobile applications that are willing to serve advertisements.

Furthermore, the interactive computing environment 100 includes the plurality of hardware components 110. In an embodiment of the present disclosure, the plurality of hardware components 110 includes but may not be limited to a gyroscope, an accelerometer, a proximity sensor, a light sensor, barometer, magnetometer, microphone, fingerprint sensor, image sensor and touch screen. The plurality of hardware 110 components is used to check activity of the plurality of users 102 on the plurality of media devices 104 during installation of the application.

Further, the interactive computing environment 100 includes the communication network 112 (as shown in FIG. 1). In an embodiment of the present disclosure, the communication network 112 enables the plurality of media devices 104 to gain access to internet. In addition, internet connection is established based on a type of network. In an embodiment of the present disclosure, the type of network is a wireless mobile network. In another embodiment of the present disclosure, the type of network is a wired network with a finite bandwidth. In yet another embodiment of the present disclosure, the type of network is a combination of the wireless and the wired network for an optimum throughput of data transmission. Further, the communication network 112 includes a set of channels. In addition, each channel of the set of channels supports finite bandwidth. Further, finite bandwidth of each channel of the set of channels is based on capacity of network.

In addition, the communication network 112 provides medium to share information among various entities of the interactive computing environment 100. In addition, the plurality of media devices 104 and the fraud identification system 114 are interlinked using the communication network 112. Further, the medium for communication may be infrared, microwave, radio frequency (RF) and the like. The communication network 112 includes but may not be limited to a local area network, a metropolitan area network, a wide area network, a virtual private network, a global area network, a home area network or any other communication network presently known in the art. The communication network 112 is a structure of various nodes or communication devices connected to each other through network topology method. In an example, the network topology includes a bus topology, a star topology, a mesh topology and the like.

The interactive computing environment 100 includes the fraud identification system 114. The fraud identification system 114 performs various tasks for detecting fraud and installing the application. Further, the fraud identification system 114 identifies whether the fraud is being committed by one or more users of the plurality of users 102 or one or more publishers of the plurality of publishers 106 in real-time. Further, the fraud identification system 114 takes actions accordingly based on the fraud detected by the fraud identification system 114.

The fraud identification system 114 displays the one or more advertisements on the mobile applications and web applications on the plurality of media devices 104. The plurality of media devices 104 is associated with the plurality of users 102. The one or more advertisements are displayed based on the interest of the plurality of users 102. The one or more advertisements are displayed for installing an application. The one or more advertisements are displayed on the plurality of publishers. The one or more advertisements are displayed in real time.

The fraud identification system 114 receives a request from the plurality of users 102 for installing the application. The plurality of users 102 requests for installing the application through the plurality of media devices 104. In addition, the request for installing the application from the plurality of users 102 is generated by clicking on the one or more advertisements 108. Further, the one or more advertisements 108 are displayed by the plurality of publishers 106 on the plurality of media devices 104 in real time. Furthermore, the fraud identification system 114 receives the request in real time. Moreover, the fraud identification system 114 provides one or more methods to the plurality of users 102 to install the application. The one or more methods include ways to identify that whether the fraud is being committed by the one or more users of the plurality of users 102 or the one or more publishers of the plurality of publishers 106. In addition, the fraud identification system 114 provides the one or more methods to the plurality of users 102 in real time. The one or more methods include various tasks which the plurality of users 102 needs to complete before installing the application. In an embodiment of the present disclosure, the one or more methods include but may not be limited to making a pattern, solving a puzzle, speaking a sentence, scanning a barcode, writing a captcha and scanning an eye movement.

In an embodiment of the present disclosure, the one or more methods include the plurality of users 102 to make a pattern on the plurality of media devices 104 to download the application. In another embodiment of the present disclosure, the one or more methods include the plurality of users 102 to solve a puzzle on the plurality of media devices 104 to download the application. In yet another embodiment of the present disclosure, the one or more methods include speaking a sentence that is displayed on the plurality of media devices 104 to download the application. In an example, the sentence "The quick brown fox jumps over the lazy dog" is displayed on the plurality of media devices 104 that need to be spoken by the plurality of users 102 to download the application.

In yet another embodiment of the present disclosure, the one or more methods include the plurality of users 102 to scan a bar code to download the application shown in the one or more advertisements 108. In an example, the plurality of users 102 is asked to point towards the source of the augmented reality and press a button in augmented reality to download the application.

In yet another embodiment of the present disclosure, the one or more methods include scanning eye movement to download the application. In yet another embodiment of the present disclosure, the one or more methods include filling captcha to download the application. In yet another embodiment of the present disclosure, the one or more methods include clicking on the install option on the plurality of media devices 104 to download the application. In yet another embodiment of the present disclosure, the one or more methods include the plurality of users 102 to blink the eye or shifting eye from left to right in order to install the application.

Further, the fraud identification system 114 fetches a first set of data from the database 118 and the plurality of media devices 104. The first set of data is associated with past typing behavior of the plurality of users 102. In an embodiment of the present disclosure, the first set of data includes but may not be limited to touch delay, touch length, typing language, typing behavior, voice command length, touch pattern and gesture recognition. In addition, the fraud identification system 114 receives the first set of data in real time. Furthermore, the fraud identification system 114 obtains the second set of data from the plurality of media devices 104. The second set of data is associated with a plurality of hardware components 110. In an embodiment of the present disclosure, the second set of data includes but may not be limited to location of media device, user data, type of media device, click to install, movement, vibration, voice data of the media devices, pre-installed applications and available storage. The fraud identification system 114 obtains the second set of data from the plurality of hardware components 110 to identify that the plurality of users 102 has completed the task in order to download the application. The fraud identification system 114 obtains the second set of data in real time.

Further, the fraud identification system 114 analyzes the first set of data and the second set of data. The first set of data and the second set of data are analyzed using one or more machine learning algorithms. In an embodiment of the present disclosure, the one or more machine learning algorithms include but may not be limited to linear discriminant analysis, learning vector quantization linear regression, logistic regression, sum of vector machine, decision tree, random forest, K-nearest neighbor function and time series. In addition, analysis is done to authenticate the one or more users of the plurality of users 102 to install the application. Further, the first set of data and the second set of data are analyzed to identify whether the fraud is being committed by the one or more users of the plurality of users 102 or the one or more publishers of the plurality of publishers 106. Furthermore, the first set of data and the second set of data are analyzed in real time. Moreover, the fraud identification system 114 may allow the plurality of users 102 to download the application after authentication based on the analysis.

In an embodiment of the present disclosure, the fraud identification system 114 analyzes the voice of the plurality of users 102 recorded during the installation in order to identify the fraud. The fraud identification system 114 may analyze voice of the plurality of users 102 to identify the fraud using speech recognition. In addition, the fraud identification system 114 may analyze the voice of the plurality of users 102 being a bot recorded voice or being spoken by the plurality of users 102 at the time of installation of the application. In another embodiment of the present disclosure, the fraud identification system 114 deciphers the data based on the one or more methods selected by the plurality of users 102. In addition, deciphering of the data is done in order to separate the one or more methods from each other. In an example, the data is deciphered based on selection of method from the one or more methods by the plurality of users 102 to install the application.

In yet another embodiment of the present disclosure, the fraud identification system 114 analyzes past typing behavior of the plurality of users 102 or the plurality of publishers 106 in real time to identify the fraud. In another embodiment of the present disclosure, the fraud identification system 114 identifies a threshold limit for number of install being done by each of the plurality of users 102. The threshold limit is identified by analyzing the number of installs being done by using method of the one or more methods. In yet another embodiment of the present disclosure, the fraud identification system 114 analyzes the threshold limit with pre-defined threshold limit for the plurality of users 102 to identify fraud or suspicious behavior. In yet another embodiment of the present disclosure, the fraud identification system 114 analyzes IP addresses, locations of the one or more users of the plurality of users 102.

Furthermore, the fraud identification system 114 identifies the one or more users of the plurality of users 102 and the one or more publishers of the plurality of publishers 106 committing the fraud. In an embodiment of the present disclosure, identification of the fraud is done by comparing past typing behavior and present typing behavior of the one or more users of the plurality of users 102 in real time. In an example, two finger typist takes time to reach edge keys, hence the distribution of the intervals between the keys can be used to determine the profile of the plurality of users 102. In an embodiment of the present disclosure, the fraud identification system 114 uses third party devices to identify the one or more users of the plurality of users 102 committing the fraud. In an embodiment of the present disclosure, third party devices includes but may not be limited to thin client, virtual reality devices, and Google Stadia. In an example, a user of the plurality of users 102 using virtual device or Google stadia cannot use mobile at the same time. Further, the fraud identification system 114 verifies whether the user of the plurality of users 102 has installed the application. Furthermore, identification is done in real time. Moreover, the fraud identification system 114 generates a report. The report includes list of the one or more users of the plurality of users 102 and the one or more publishers of the plurality of the plurality of publishers 106 committing the fraud.

Also, the fraud identification system 114 blocks the one or more publishers of the plurality of publishers 106 and the one or more users of the plurality of users 102 committing the fraud. The one or more publishers of the plurality of publishers 106 and the one or more users of the plurality of users 102 committing the fraud are identified based on analysis of the first set of data and the second set of data. In addition, the fraud identification system 114 updates list of blocked publishers and users after a period of time. In addition, the one or more publishers and the one or more users are blocked in real time.

The interactive computing environment 100 includes the server 116. The server 116 is used to perform task of accepting request and respond to the request of other functions. In an embodiment of the present disclosure, the server 116 is a cloud server which is used for cloud computing to enhance the real-time processing of the system and using virtual space for task performance. In an embodiment of the present disclosure, the server 116 may be any other server based on the requirement for application installation and detection of fraud in advertisement.

The interactive computing environment 100 includes the database 118 (as shown in FIG. 1). The database 118 is storage location where all information associated with the fraud identification system 114 is stored for accessing. The database 118 includes data that is pre-stored in the database 118 and data collected in real-time. In an embodiment of the present disclosure, the database 118 is a cloud database or any other database based on the requirement for application installation and detection of fraud in advertisement. The data is stored in the database 118 in various tables. In general, tables are matrix that stores different types of data in the form of rows and columns. In an example, one table may store the first set of data with media devices usage behavior of the plurality of users 102. In another example, other table may store the second set of data with the plurality of hardware components 110. The database 118 is included inside the server 116.

FIGS. 2A and 2B illustrate a flow chart 200 of a method for the application installation and detection of fraud in advertisements, in accordance with various embodiments of the present disclosure. It may be noted that to explain the process steps of flowchart 200, references will be made to the system elements of FIG. 1. It may also be noted that the flowchart 200 may have fewer or more number of steps.

The flowchart 200 initiates at step 202. Following step 202, at step 204, the fraud identification system 114 displays the one or more advertisements 108 on the mobile applications and the web applications on the plurality of media devices 104. Further, the one or more advertisements 108 are displayed on the basis of interests of the plurality of users 102. Furthermore, the one or more advertisements 108 are displayed for installing the application. Furthermore, the computer implemented method includes a fourth step to fetch a first set of data from a database and the plurality of media devices. The first set of data is associated with past typing behavior of the plurality of users. In addition, the first set of data is received in real time. At step 206, the fraud identification system 114 receives the request to download the application. The plurality of users 102 requests for installing the application through the plurality of media devices 104. At step 208, the fraud identification system 114 provides the one or more methods to the plurality of users 102. The one or more methods are provided to the plurality of users 102 for installing the application. In addition, the one or more methods include ways to authenticate the plurality of users 102. At step 310, the fraud identification system 114 fetches the first set of data from the database and the plurality of media devices 104. The first set of data is associated with the past typing behavior of the plurality of users 102. At step 312, the fraud identification system 114 obtains the second set of data from the plurality of media devices 104. The second set of data is associated with the plurality of hardware components 110. At step 214, the fraud identification system 114 analyzes the first set of data and the second set of data. The first set of data and the second set of data are analyzed using the one or more machine learning algorithm. In addition, the analysis is done to authenticate the user of the plurality of users 102 for installing the application. Further, the first set of data and the second set of data are analyzed to identify whether the fraud has been committed by the plurality of users 102 or the plurality of publishers. At step 216, the fraud identification system 114 blocks the publisher of the plurality of publishers and the user of the plurality of users 102 committing the fraud. The publisher of the plurality of publishers and the user of the plurality of users 102 committing the fraud are identified on the basis of the analysis of the first set of data and the second set of data. In addition, the publisher and the user are blocked in real time. The flow chart 200 terminates at step 218.

FIG. 3 illustrates a block diagram of a computing device 300, in accordance with various embodiments of the present disclosure. The computing device 300 is a non-transitory computer readable storage medium. The computing device 300 includes a bus 302 that directly or indirectly couples the following devices: memory 304, one or more processors 306, one or more presentation components 308, one or more input/output (I/O) ports 310, one or more input/output components 312, and an illustrative power supply 314. The bus 302 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 3 is merely illustrative of an exemplary computing device 300 that can be used in connection with one or more embodiments of the present invention. Distinction is not made between such categories as "workstation," "server," "laptop," "hand-held device," etc., as all are contemplated within the scope of FIG. 3 and reference to "computing device."

The computing device 300 typically includes a variety of computer-readable media. The computer-readable media can be any available media that can be accessed by the device 300 and includes both volatile and nonvolatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the device 300. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 304 includes computer-storage media in the form of volatile and/or nonvolatile memory. The memory 304 may be removable, non-removable, or a combination thereof. Exemplary hardware devices include solid-state memory, hard drives, optical-disc drives, etc. The computing device 300 includes the one or more processors 306 that read data from various entities such as memory 304 or I/O components 312. The one or more presentation components 308 present data indications to the user or other device. Exemplary presentation components include a display device, speaker, printing component, vibrating component, etc. The one or more I/O ports 310 allow the computing device 300 to be logically coupled to other devices including the one or more I/O components 312, some of which may be built in. Illustrative components include a microphone, joystick, gamepad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

We claim:

1. A computer-implemented method for application installation and detection of fraud in advertisement, the computer-implemented method comprising:

displaying, at a fraud identification system with a processor, one or more advertisements on mobile applications and web applications on a plurality of media devices, wherein the plurality of media devices are associated with a plurality of users, wherein the one or more advertisements are displayed based on interest of the plurality of users, wherein the one or more advertisements are displayed for installing an application, wherein the one or more advertisements are displayed on a plurality of publishers, wherein the one or more advertisements are displayed in real time;

receiving, at the fraud identification system with the processor, a plurality of users requests for downloading and installing the application through the plurality of media devices, wherein a request for installing the application is generated by clicking on the one or more advertisements displayed on the plurality of media devices, wherein a request for installing the application is received in real time;

providing, at the fraud identification system with the processor, one or more methods to the plurality of users, wherein the one or more methods are provided to the plurality of users for installing the application, wherein the one or more methods comprises ways for authenticating the plurality of users, wherein the one or more methods includes instructions to the plurality of users to point towards a source of an augmented reality and press a button in the augmented reality to download the application, and wherein the one or more methods are provided in real time;

fetching, at the fraud identification system with the processor, a first set of data from a database and the plurality of media devices, wherein the first set of data is associated with past typing behavior of each user of the plurality of users, wherein the first set of data includes touch delay, touch length, typing behavior, typing language, voice command length, voice recognition, touch pattern and gesture recognition, wherein the first set of data is fetched in real time;

obtaining, at the fraud identification system with the processor, a second set of data from the plurality of media devices, wherein the second set of data is associated with a plurality of hardware components comprising a barometer, wherein the second set of data comprises location of media device, user data, type of media device, pre-installed applications and available storage, wherein the second set of data is obtained in real time;

analyzing, at the fraud identification system with the processor, the first set of data and the second set of data in real-time, wherein the first set of data and the second set of data are analyzed using one or more machine learning algorithm, wherein the analysis is performed for authenticating one or more users of the plurality of users for installing the application, wherein the first set of data and the second set of data are analyzed for identifying whether the one or more users of the plurality of users are committing fraud, wherein the identification of the fraud is performed by comparing the past typing behavior and present typing behavior of the one or more users of the plurality of users in real time; and blocking, at the fraud identification system with the processor, one or more publishers of the plurality of publishers and the one or more users of the plurality of users committing the fraud, wherein the one or more publishers of the plurality of publishers and the one or more users of the plurality of users committing the fraud are identified based on analysis of the first set of data and the second set of data, wherein the one or more publishers and the one or more users are blocked in real time.

2. The computer-implemented method as recited in claim 1, wherein the plurality of publishers comprises at least one of web pages, websites, mobile application and blogs.

3. The computer-implemented method as recited in claim 1, wherein the one or more methods comprises making a pattern, solving a puzzle, speaking a sentence, scanning a barcode, writing a captcha and scanning an eye movement.

4. The computer-implemented method as recited in claim 1, wherein the plurality of hardware components comprises a gyroscope, an accelerometer, a proximity sensor, a light sensor, magnetometer, microphone, fingerprint sensor, image sensor and touch screen.

5. The computer-implemented method as recited in claim 1, wherein the one or more machine learning algorithm comprises linear discriminant analysis, learning vector quantization, linear regression, logistic regression, sum of vector machine, decision tree, random forest, K-nearest neighbor function and time series.

6. The computer-implemented method as recited in claim 1, further comprising generating, at the fraud identification system with the processor, a report, wherein the report includes a list of the one or more users and the one or more publishers committing the fraud.

7. A computer system comprising:
one or more processors; and
a memory coupled to the one or more processors, the memory for storing instructions which, when executed by the one or more processors, cause the one or more processors to perform a method for application installation and detection of fraud in advertisement, the method comprising:
  displaying, at a fraud identification system, one or more advertisements on mobile applications and web applications on a plurality of media devices, wherein the plurality of media devices are associated with a plurality of users, wherein the one or more advertisements are displayed based on interest of the plurality of users, wherein the one or more advertisements are displayed for installing an application, wherein the one or more advertisements are displayed on a plurality of publishers, wherein the one or more advertisements are displayed in real time;
  receiving, at the fraud identification system, a plurality of users requests for downloading and installing the application through the plurality of media devices, wherein a request for installing the application is generated by clicking on the one or more advertisements displayed on the plurality of media devices, wherein a request for installing the application is received in real time;
  providing, at the fraud identification system, one or more methods to the plurality of users, wherein the one or more methods are provided to the plurality of users for installing the application, wherein the one or more methods comprises ways for authenticating the plurality of users, wherein the one or more methods includes instructions to the plurality of user to point towards a source of an augmented reality and press a button in the augmented reality to download the application, and wherein the one or more methods are provided in real time;
  fetching, at the fraud identification system, a first set of data from a database and the plurality of media devices, wherein the first set of data is associated with past typing behavior of each user of the plurality of users, wherein the first set of data includes touch delay, touch length, typing behavior, typing language, voice command length, voice recognition, touch pattern and gesture recognition, wherein the first set of data is fetched in real time;
  obtaining, at the fraud identification system, a second set of data from the plurality of media devices, wherein the second set of data is associated with a plurality of hardware components comprising a barometer, wherein the second set of data comprises location of media device, user data, type of media device, pre-installed applications and available storage, wherein the second set of data is obtained in real time;
  analyzing, at the fraud identification system, the first set of data and the second set of data in real-time, wherein the first set of data and the second set of data are analyzed using one or more machine learning algorithm, wherein the analysis is performed for authenticating one or more users of the plurality of users for installing the application, wherein the first set of data and the second set of data are analyzed for identifying whether the one or more users of the plurality of users are committing fraud, wherein the identification of the fraud is performed by comparing the past typing behavior and present typing behavior of the one or more users of the plurality of users in real time; and
  blocking, at the fraud identification system, one or more publishers of the plurality of publishers and the one or more users of the plurality of users committing the fraud, wherein the one or more publishers of the plurality of publishers and the one or more users of the plurality of users committing the fraud are identified based on analysis of the first set of data and the second set of data, wherein the one or more publishers and the one or more users are blocked in real time.

8. The computer system as recited in claim 7, wherein the plurality of publishers comprises at least one of web pages, websites, mobile application and blogs.

9. The computer system as recited in claim 7, wherein the one or more methods comprises making a pattern, solving a puzzle, speaking a sentence, scanning a barcode, writing a captcha and scanning an eye movement.

10. The computer system as recited in claim 7, wherein the plurality of hardware components comprises a gyroscope, an accelerometer, a proximity sensor, a light sensor, magnetometer, microphone, fingerprint sensor, image sensor and touch screen.

11. The computer system as recited in claim 7, wherein the one or more machine learning algorithm comprises linear discriminant analysis, learning vector quantization, linear regression, logistic regression, sum of vector machine, decision tree, random forest, K-nearest neighbor function and time series.

12. The computer system as recited in claim 7, further comprising generating, at the fraud identification system, a report, wherein the report includes a list of the one or more users and the one or more publishers committing the fraud.

13. A non-transitory computer-readable storage medium encoding computer executable instructions that, when executed by at least one processor, performs a method for application installation and detection of fraud in advertisement, the method comprising:
  displaying, at a computing device, one or more advertisements on mobile applications and web applications on a plurality of media devices, wherein the plurality of media devices are associated with a plurality of users, wherein the one or more advertisements are displayed based on interest of the plurality of users, wherein the one or more advertisements are displayed for installing an application, wherein the one or more advertisements are displayed on a plurality of publishers, wherein the one or more advertisements are displayed in real time;
  receiving, at the computing device, a plurality of users requests for downloading and installing the application through the plurality of media devices, wherein a request for installing the application is generated by clicking on the one or more advertisements displayed on the plurality of media devices, wherein a request for installing the application is received in real time;
  providing, at the computing device, one or more methods to the plurality of users, wherein the one or more methods are provided to the plurality of users for installing the application, wherein the one or more methods comprises ways for authenticating the plurality of users, wherein the one or more methods includes instructions to the plurality of user to point towards a source of an augmented reality and press a button in the augmented reality to download the application, and wherein the one or more methods are provided in real time;

fetching, at the computing device, a first set of data from a database and the plurality of media devices, wherein the first set of data is associated with past typing behavior of each user of the plurality of users, wherein the first set of data includes touch delay, touch length, typing behavior, typing language, voice command length, voice recognition, touch pattern and gesture recognition, wherein the first set of data is fetched in real time;

obtaining, at the computing device, a second set of data from the plurality of media devices, wherein the second set of data is associated with a plurality of hardware components comprising a barometer, wherein the second set of data comprises location of media device, user data, type of media device, pre-installed applications and available storage, wherein the second set of data is obtained in real time;

analyzing, at the computing device, the first set of data and the second set of data in real-time, wherein the first set of data and the second set of data are analyzed using one or more machine learning algorithm, wherein the analysis is performed for authenticating one or more users of the plurality of users for installing the application, wherein the first set of data and the second set of data are analyzed for identifying whether the one or more users of the plurality of users are committing the fraud, wherein the identification of the fraud is performed by comparing the past typing behavior and present typing behavior of the one or more users of the plurality of users in real time; and blocking, at the computing device, one or more publishers of the plurality of publishers and the one or more users of the plurality of users committing the fraud, wherein the one or more publishers of the plurality of publishers and the one or more users of the plurality of users committing the fraud are identified based on analysis of the first set of data and the second set of data, wherein the one or more publishers and the one or more users are blocked in real time.

14. The non-transitory computer-readable storage medium as recited in claim 13, wherein the one or more methods comprises making a pattern, solving a puzzle, speaking a sentence, scanning a barcode, writing a captcha and scanning an eye movement.

* * * * *